United States Patent [19]

Lotsch

[11] 4,016,151
[45] Apr. 5, 1977

[54] PHENYL-SUBSTITUTED PHTHALAZONE AZO DYES WITH A COUPLING COMPONENT OF THE PHENOL, NAPTHOL, ACETOACETARYLIDE, PYRAZALONE, QUINOLONE, PYRIDONE, PYRIMIDONE OR ISOQUINOLONE SERIES

[75] Inventor: Wolfgang Lotsch, Beindersheim, Germany

[73] Assignee: Badische Anilin- & Soda-Fabrik Aktiengesellschaft, Ludwigshafen (Rhine), Germany

[22] Filed: Apr. 28, 1975

[21] Appl. No.: 572,420

[30] Foreign Application Priority Data

May 21, 1974 Germany .......................... 2424538

[52] U.S. Cl. ................................. 260/154; 106/23; 106/288 Q; 260/42.21; 260/250 P
[51] Int. Cl.$^2$ ................... C09B 29/36; D06P 1/52; D06P 1/76
[58] Field of Search .................................. 260/154

[56] References Cited
UNITED STATES PATENTS 3,923,774  12/1975  Dimroth ............................ 260/154

Primary Examiner—Daniel E. Wyman
Assistant Examiner—John J. Doll
Attorney, Agent, or Firm—Johnston, Keil, Thompson & Shurtleff

[57] ABSTRACT

Azo dyes having a phenyl-substituted phthalazone as the diazo component and a coupling component containing a hydroxy group or an enolizable keto group, said coupling component being selected from the phenol, naphthol, acetoacetarylide, pyrazalone, quinolone, pyridone, pyrimidone or isoquinolone series. The dyes have pigmentary character with good light fastness and also fastness to overcoating, migration and overspraying, and are thus eminently suitable for the coloring of printing inks, surface coatings and plastics, such as polyvinyl chloride or polyester fibers, the pigments being substantially insoluble in solvents and further exhibiting resistance to high temperatures and fastness to weathering.

9 Claims, No Drawings

PHENYL-SUBSTITUTED PHTHALAZONE AZO DYES WITH A COUPLING COMPONENT OF THE PHENOL, NAPTHOL, ACETOACETARYLIDE, PYRAZOLONE, QUINOLONE, PYRIDINE, PYRIMIDONE OR ISOQUINOLONE SERIES

The invention relates to dyes of the formula (I):

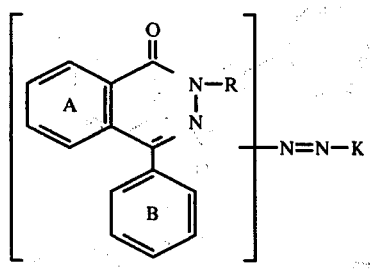

in which
K is the radical of a coupling component which contains a hydroxy group or an enolizable keto group in the ortho- or para-position to the azo bridge; and R is hydrogen or an optionally substituted aliphatic, cycloaliphatic, araliphatic or aromatic radical and in which the rings A and B may bear substituents.

Examples of substituents for the rings A and B are: bromo, nitro, methyl, methoxy, ethoxy, phenoxy, hydroxy, thiophenoxy, phenyl, acylamino, cyano, methylsulfonyl and sulfamoyl. Examples of acylamino radicals are acetylamino, benzoylamino and benzenesulfonylamino.

Examples of radicals R are alkyl of one to eight carbon atoms, which may bear hydroxy, alkoxy of one to four carbon atoms, cyano, acyloxy, carbamoyl or N-substituted carbamoyl as a substituent, cyclohexyl, benzyl, phenylethyl, styryl and particularly hydrogen, phenyl, phenyl bearing halogen, alkyl, alkoxy, cyano, nitro, carbamoyl, N-phenylcarbamoyl, sulfamoyl, N-substituted sulfamoyl, arylsulfonyl, C-acylamino or S-acylamino as a substituent, naphthyl or anthraquinonyl.

Examples of radicals R in addition to those already specified are: methyl, isopropyl, butyl, β-hydroxyethyl, β-ethoxyethyl, acetoxymethyl, carbamoylmethyl, chlorophenyl, dichlorophenyl, methylphenyl, methoxyphenyl, methoxychlorophenyl, methoxydichlorophenyl, methylchlorophenyl, cyanophenyl, nitrophenyl, nitrochlorophenyl, nitromethoxyphenyl, nitromethylphenyl, carbamoylphenyl, N-phenylcarbamoylphenyl, sulfamoylphenyl, N-phenylsulfamoylphenyl, N-dichlorophenylsulfamoylphenyl, phenylsulfonylphenyl, acetylaminophenyl, benzoylaminophenyl, dichlorobenzoylaminophenyl and naphthoylaminophenyl.

Examples of suitable coupling components are compounds of the phenol, naphthol, acetoacetarylide, pyrazolone, quinolone, pyridone, pyrimidone and isoquinolone series.

Examples of specific coupling components are: phenol, o-cresol, m-cresol, p-cresol, α-naphthol, β-naphthol, 2-naphthol-3-carboxylic acid ester and amide, acetoacetanilide, acetoacet-o-anisidide, 1-phenyl-3-methyl-pyrazolone, 1-phenylpyrazolone-3-carboxylic acid ester or amide, 2,4-dihydroxyquinoline, N-methyl-4-hydroxyquinolone-2, 2,6-dihydroxy-3-cyano-4-methylpyridine, 2,6-dihydroxy-3-carbamoyl-4-methylpyridine, N-methyl-2-hydroxy-3-cyano-4-methylpyridone-6, N-γ-methoxypropyl-2-hydroxy-3-cyano-4-methylpyridone-6, N-butyl-2-hydroxy-3-cyano-4-methylpyridone-6, N-benzyl-2-hydroxy-3-cyano-4-methylpyridone-6, 2-amino-4,6-dihydroxypyrimidine, 2,4-dihydroxy-6-aminopyrimidine, 2,4-diamino-6-hydroxypyrimidine, 1,3-dimethyl-4-hydroxypyrimidinedione-2,6 and 1,3-dihydroxyisoquinoline.

Dyes of the formula (I) may be prepared by reaction of a diazo compound of an amine of the formula (II):

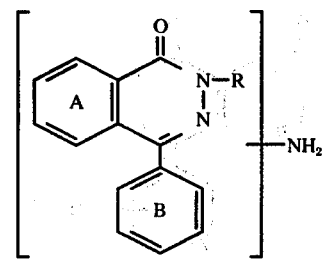

wherein A, B and R have the above meanings with a coupling component of the formula: HK
where K has the above meanings.

Compounds of the formula (II) (1-phenylphthalazone-(4) derivatives) may be prepared by methods known from the literature, for example from the corresponding substituted 2-benzoylbenzoic acids and hydrazine, monoalkylhydrazines or monoarylhydrazines.

For the production of a dye having a 2-naphthol-3-carboxamide component it is convenient to start from an acid chloride of the formula:

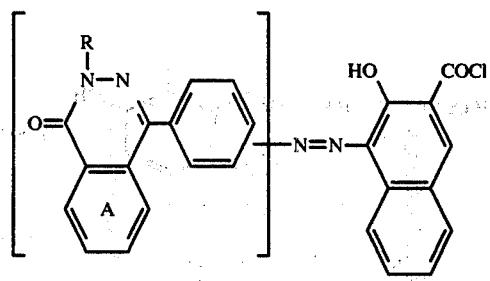

and to convert it into the dye amide by reaction with an appropriate amine by a conventional method.

Dyes which are suitable as pigments are particularly compounds of the formula (I) in which R is hydrogen or an aromatic radical and K is the radical of a coupling component of the β-naphthol, acetoacetarylide, pyrimidine, dihydroxyquinoline or dihydroxypyridine series. These dyes are distinguished by substantial insolubility in solvents and as pigments they exhibit in nearly every case good fastness to overcoating, migration and overspraying as well as very good fastness to light. They are therefore suitable for example for use in printing inks, surface coatings or plastics such as PVC. Moreover the resistance to high temperature of the new pigments which in some cases is outstanding and their excellent resistance to adverse weather conditions are to be emphasized.

Pigments of the formula (I) are not always obtained in the optimum physical form for a specific application. They may be converted however into the most suitable form by conventional methods such as grinding with salt, or heating in water or solvents.

Other dyes of formula (I), particularly those in which R is an aliphatic radical and the coupling component is derived from the cresol, N-alkylpyrimidine, N-alkylpyridine or N-alkylquinoline series are good disperse dyes which are particularly suitable for dyeing polyester fibers and which give dyeings having good lightfastness properties.

Particular importance attaches to dyes of the formula

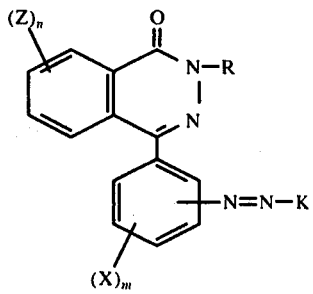

in which
R is hydrogen; phenyl; phenyl substituted by chloro, bromo, methyl, ethyl, methoxy, ethoxy, cyano, nitro, sulfamoyl, phenylsulfonyl, N-phenylsulfamoyl, carbamoyl, N-phenylcarbamoyl, acetylamino or benzoylamino; or naphthyl;
$m$ is 1 or 2;
$n$ is zero, 1, 2, 3 or 4;
X is chloro, methyl or methoxy;
Z is chloro or bromo; and

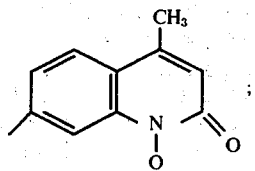

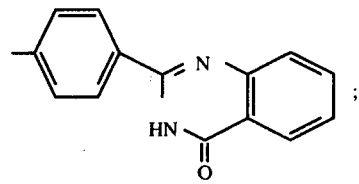

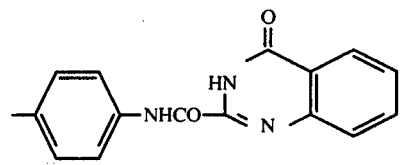

or

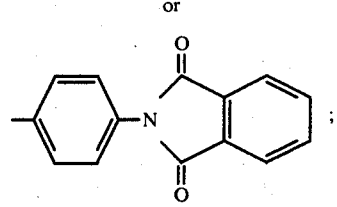

$Ar^2$ is phenyl; or phenyl substituted by chloro, methyl or sulfamoyl;

$Ar^3$ is phenyl; phenyl substituted by chloro, bromo,

K is $CH_3COCH-CONHAr^1$, 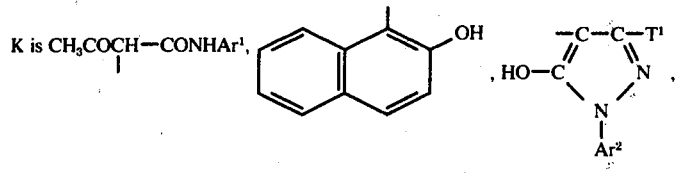

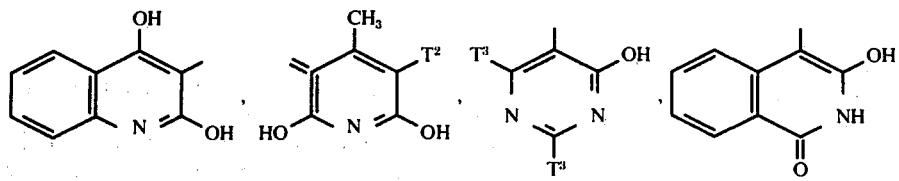

or 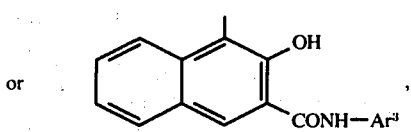, $Ar^1$ is phenyl; or phenyl substituted by chloro, methoxy, ethoxy, methyl, acetylamino or benzoylamino;

nitro, methoxy, ethoxy, alkyl of one to four carbon atoms, carbamoyl, sulfamoyl, N-phenylcarbamoyl, N-chlorophenylcarbamoyl, N-methylphenylcarbamoyl, N-methoxyphenylcarbamoyl, N-β-anthraquinonylcarbamoyl, phthalimido, benzoylamino, benzoylamino substituted by chloro, methyl, methoxy or acetylamino;

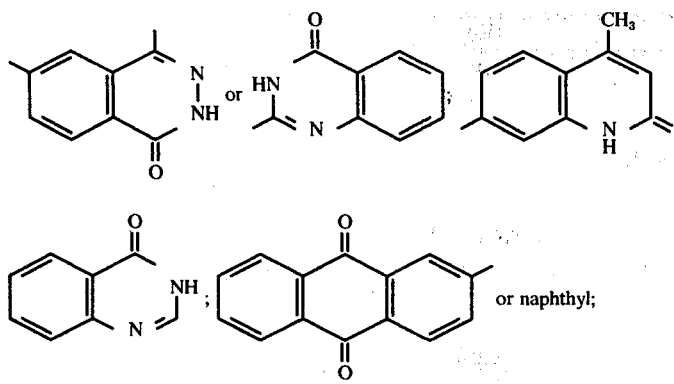

T¹ is methyl or carbamoyl;
T² is cyano or carbamoyl; and
T³ is hydroxyl or amino.

Particular industrial importance attaches to dyes of formula (Ia):

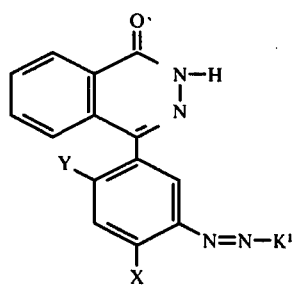

in which
X is hydrogen, chloro, methyl or methoxy;
Y is hydrogen or chloro; and
K¹ is the radical of a coupling component of the acetoacetarylide and particularly of the pyrazolone or 2-naphthol-3-carboxamide series.

The following Examples illustrate the invention. Unless otherwise stated, parts and percentages in the Examples are by weight.

EXAMPLE 1

27.2 parts of 1-(4'-chloro-3'-aminophenyl)-phthalazone-(4) is dissolved in 140 parts of concentrated sulfuric acid and diazotized at 0° to 10° C by the addition of 30 parts of nitrosylsulfuric acid (12.7% of $N_2O_3$). The whole is stirred for another 4 hours at 0° to 10° C, the diazotization mixture is then poured into a mixture of 1000 parts of ice and 1000 parts of water, excess nitrite is removed by adding urea and 26.3 parts of finely powdered 2-naphthol-3-carboxylic acid N-phenylamide is added. A pH of from 6 to 7 is set up by dripping in dilute caustic soda solution. The whole is stirred for another six hours, suction filtered and washed throroughly with water. The filtered product is introduced into 400 parts of dimethylformamide and stirred for 3 hours at 100° C, suction filtered, throroughly washed with dimethylformamide and then with methanol and dried. 49 parts of a red powder of the formula:

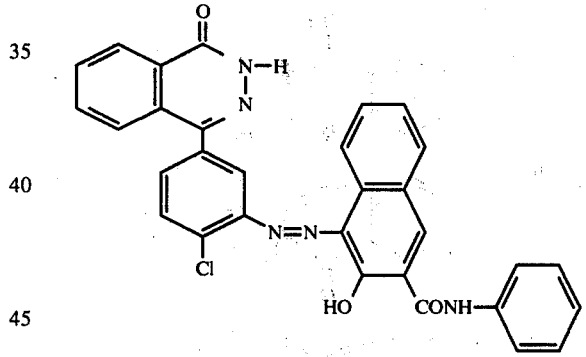

is obtained.

Similar dyes with the coupling components specified in the Table and with the hue indicated are obtained analogously to Example 1.

| Example No. | Coupling component | Hue |
| --- | --- | --- |
| 2 | ![naphthol-OH-CONH-C6H4-Cl] | red |
| 3 | ![naphthol-OH-CONH-C6H4-OCH3] | red |

-continued

| Example No. | Coupling component | Hue |
|---|---|---|
| 4 | 3-hydroxy-N-(4-methylphenyl)-2-naphthamide | red |
| 5 | 2-naphthol | orange red |
| 6 | $CH_3-COCH_2-CONH-C_6H_5$ | yellow |
| 7 | 7-(acetoacetylamino)-4-methylcarbostyril | yellow |
| 8 | bis-acetoacetylamino compound with benzamide/imine linkage | yellow |
| 9 | 2,4-dihydroxyquinoline | yellow |
| 10 | 3-hydroxy-isocarbostyril | yellow |
| 11 | 2-amino-4,6-dihydroxypyrimidine | yellow |
| 12 | 2,6-diamino-4-hydroxypyrimidine | yellow |
| 13 | 6-amino-2,4-dihydroxypyrimidine | yellow |
| 14 | 3-cyano-2,6-dihydroxy-4-methylpyridine | yellow |

-continued

| Example No. | Coupling component | Hue |
|---|---|---|
| 15 | (structure: pyridine-diol with CH₃ and CONH₂ substituents) | yellow |
| 16 | CH₃—COCH₂—CONH—(phenyl)—N(phthalimide) | yellow |
| 17 | CH₃—COCH₂—CONH—(phenyl with OCH₃) | yellow |
| 18 | (3-methyl-5-pyrazolone) | yellow |
| 19 | (1-phenyl-3-methyl-5-pyrazolone enol form) | yellow |
| 20 | H₂N—OC—(pyrazolone with phenyl, OH) | yellow |
| 21 | (3-hydroxy-2-phenyl-isoquinolin-1(2H)-one) | yellow |
| 22 | 3-hydroxy-2-naphthoyl—NH—(phenyl with Cl, OCH₃, OCH₃) | bordeaux |
| 23 | 3-hydroxy-2-naphthoyl—NH—(phenyl with OCH₃) | red |
| 24 | 3-hydroxy-2-naphthoyl—NH—(phenyl with CH₃, OCH₃) | red |
| 25 | 3-hydroxy-2-naphthoic acid methyl ester (COOCH₃) | red |

-continued

| Example No. | Coupling component | Hue |
|---|---|---|
| 26 | 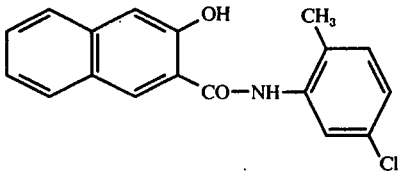 | red |

EXAMPLE 27

The procedure described in Example 1 is followed but 18.8 parts of β-hydroxynaphthoic acid is used as the coupling component. After coupling is over the whole is acidified with dilute sulfuric acid to pH 1 and washed thoroughly with water and dried. 42 parts of the acid:

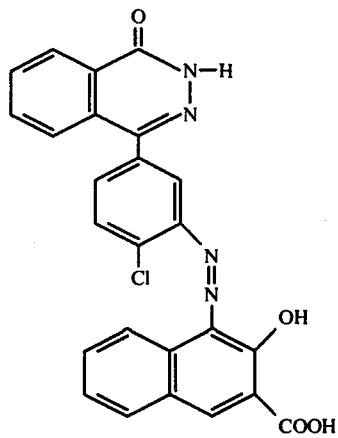

is obtained. 470 parts of this acid is heated in 2200 parts of dry dichlorobenzene, 2 parts of dimethylformamide and 350 parts of thionyl chloride for one hour at 100° C, for 2 hours at 120° C and for 1 hour at 130° C, then cooled, suction filtered while cold, washed with dry benzene and dried. 295 parts of the acid chloride is obtained in this way.

24.4 parts of this acid chloride is introduced into 250 parts of dry dichlorobenzene, 22 parts of p-aminobenzanilide is added and the whole is stirred for 1 hour at 90° C, for 1 hour at 110° C and for two hours at 120° C. The whole is suction filtered while hot, washed with dichlorobenzene and methanol and dried. 30 parts of a red powder of the formula:

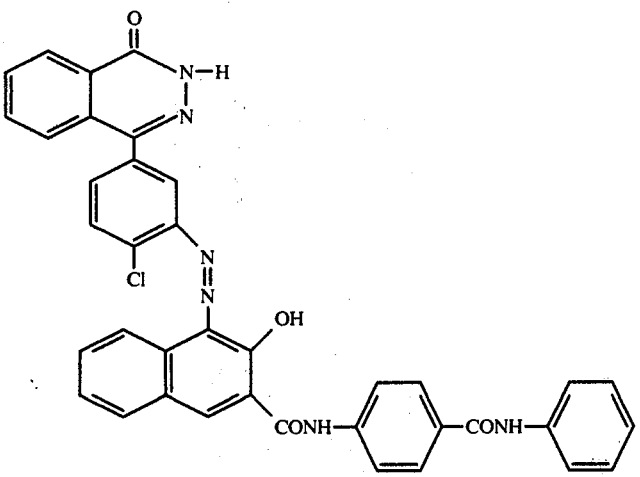

is obtained.

EXAMPLES 28 to 67

The procedure described in Example 27 is repeated but the amines specified in the Table are used instead of p-aminobenzanilide. The corresponding dyes inhibiting the hues indicated are thus obtained.

| Example No. | Amine | Hue |
|---|---|---|
| 28 | 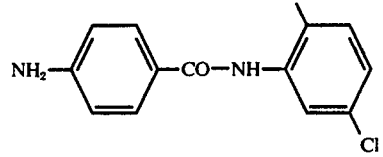 | red |

-continued
| Example No. | Amine | Hue |
|---|---|---|
| 29 | 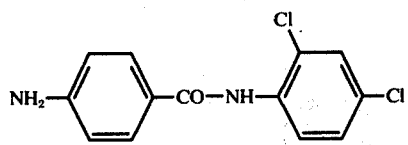 | red |
| 30 | 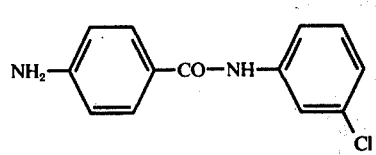 | red |
| 31 | 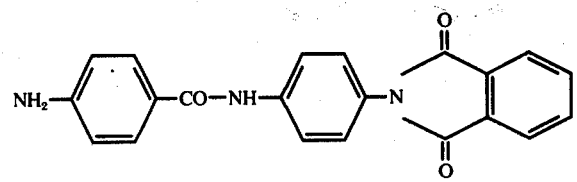 | red |
| 32 | 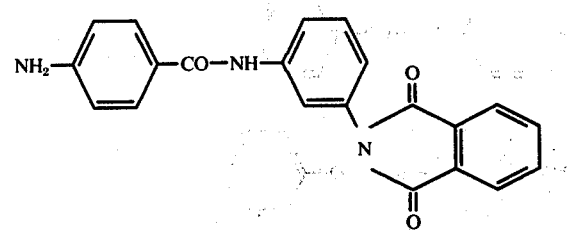 | red |
| 33 | 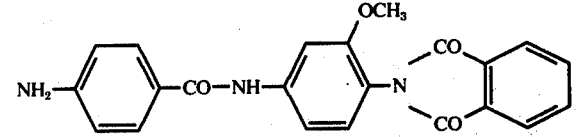 | red |
| 34 | 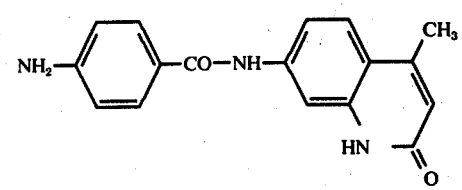 | red |
| 35 | 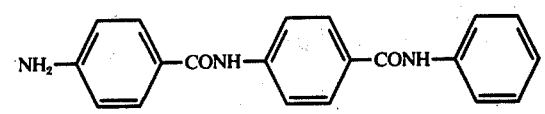 | red |
| 36 | 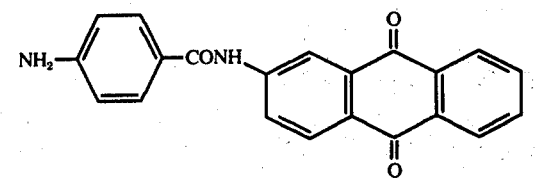 | red |
| 37 | 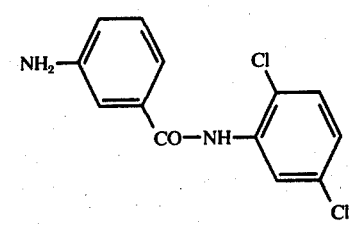 | red |

-continued

| Example No. | Amine | Hue |
|---|---|---|
| 38 | 3-aminobenzamide linked to 4-(phthalimido)aniline | red |
| 39 | 3-amino-N-(anthraquinon-2-yl)benzamide | red |
| 40 | 5-amino-2-chloro-N-[4-(benzoylamino)phenyl]benzamide | red |
| 41 | 4-amino-2-chloro-N-[4-(benzoylamino)phenyl]benzamide | red |
| 42 | 5-amino-2-methoxy-N-[4-(benzoylamino)phenyl]benzamide | red |
| 43 | 5-amino-2-methoxy-N-[4-(phthalimido)phenyl]benzamide | Bordeaux |
| 44 | 5-amino-2,4-dichloro-N-[4-(phthalimido)phenyl]benzamide | red |
| 45 | 5-amino-2-methyl-N-(2,5-dichlorophenyl)benzamide | red |

-continued

| Example No. | Amine | Hue |
|---|---|---|
| 46 | 5-amino-2-methoxy-benzoyl-NH-(4-phenyl)-CO-NH-phenyl | Bordeaux |
| 47 | 4-amino-benzoyl-NH-(4-phenyl)-SO₂NH₂ | red |
| 48 | 4-amino-benzoyl-NH-(4-chloro-phenyl)-SO₂-NH-phenyl | red |
| 49 | 4-amino-benzoyl-NH-(3-phenyl)-SO₂-NH-(2,4-dichlorophenyl) | red |
| 50 | 3-amino-benzoyl-NH-(3-phenyl)-SO₂-NH-(2,5-dichlorophenyl) | red |
| 51 | 4-amino-benzoyl-NH-(4-phenyl)-N(phthalimido with 4-CO-NH-phenyl) | red |
| 52 | 4-amino-phenyl-NH-CO-phenyl | red |
| 53 | 4-amino-phenyl-NH-CO-(4-phenyl)-N-phthalimido | red |
| 54 | 4-amino-phenyl-NH-CO-(2,4-dichlorophenyl) | red |
| 55 | 4-amino-2-chloro-phenyl-NH-CO-(2,4-dichlorophenyl) | red |

| Example No. | Amine | Hue |
|---|---|---|
| 56 | H₂N–C₆H₄–NH–CO–[C₆H₃]–(CO)₂N–C₆H₃(Cl)₂ (2,5-dichlorophenyl) | red |
| 57 | (2-Cl)H₂N–C₆H₃–NH–CO–[C₆H₃]–(CO)₂N–C₆H₄–CH₃ (4-methylphenyl) | red |
| 58 | (2,4-diCl)H₂N–C₆H₂–NH–CO–[C₆H₃]–(CO)₂N–C₆H₄–OCH₃ (3-methoxyphenyl) | maroon |
| 59 | (2-CH₃)H₂N–C₆H₃–NH–CO–[C₆H₃]–(CO)₂N–C₆H₃(5-Cl, 2-OCH₃) | Bordeaux |
| 60 | (2-OCH₃)H₂N–C₆H₃–NH–CO–[C₆H₃]–(CO)₂N–C₆H₅ | Bordeaux |
| 61 | H₂N–C₆H₄–NH–CO–C₆H₄–N(CO)₂C₆H₄ | red |
| 62 | H₂N–C₆H₄–NH–CO–NH–C₆H₅ | red |
| 63 | H₂N–C₆H₄–NH–CO–CO–NH–C₆H₅ | red |

-continued

| Example No. | Amine | Hue |
|---|---|---|
| 64 | [4-aminophenyl-NH-CO-2-anthraquinonyl] | red |
| 65 | [4-aminophenyl-NH-CO-3-(phthalimido)phenyl] | red |
| 66 | [4-amino-2-chlorophenyl-NH-CO-3-(phthalimido)phenyl] | red |
| 67 | [4-aminophenyl-N(CO-)2-benzene-CO-NH-2,4-dichlorophenyl] | red |

Dyes having the hue specified are obtained analogously to Example 1 or 27 with the diazotization and coupling components in the following Table. Dyes indicated by "disp" in the column "Hue" are polyester disperse dyes which when dyed onto polyester by a conventional method give the hue indicated in good fastness properties.

Diazo component for Examples 68 to 100:

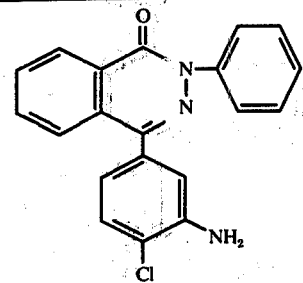

| Example | Coupling component | Hue |
|---|---|---|
| 68 | 3-hydroxy-2-naphthoic acid anilide | red |
| 69 | 3-hydroxy-2-naphthoic acid o-toluidide | red |

-continued

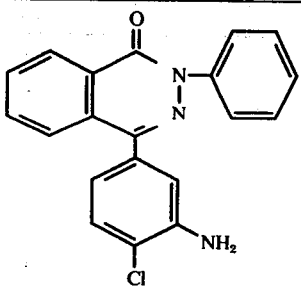

| Example | Coupling component | Hue |
|---|---|---|
| 70 | 3-hydroxy-2-naphthoyl-(4-chloroanilide) | red |
| 71 | 3-hydroxy-2-naphthoyl-(4-methoxyanilide) | red |
| 72 | 3-hydroxy-2-naphthoyl-(1-naphthylamide) | red |
| 73 | 3-hydroxy-2-naphthoyl-(2-methyl-5-chloroanilide) | red |
| 74 | 3-hydroxy-2-naphthoyl-(2,5-dimethoxyanilide) | red |
| 75 | 3-hydroxy-2-naphthoyl-(3-nitroanilide) | red |
| 76 | 3-hydroxy-2-naphthoyl-(2-methoxyanilide) | red |
| 77 | 3-hydroxy-2-naphthoyl-(2-methyl-4-methoxyanilide) | red |

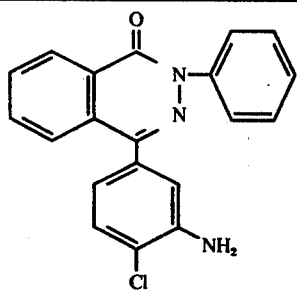
| Example | Coupling component | Hue |
|---|---|---|
| 78 | 3-hydroxy-2-naphthoyl-(5-chloro-2,4-dimethoxy)anilide | Bordeaux |
| 79 | 3-hydroxy-2-naphthoyl-(2-ethoxy)anilide | red |
| 80 | 2-naphthol | orange, disp |
| 81 | 3-methyl-1-(2-chlorophenyl)-5-pyrazolone | yellow |
| 82 | 3-methyl-1-(4-chlorophenyl)-5-pyrazolone | yellow |
| 83 | 3-methyl-1-(3-chlorophenyl)-5-pyrazolone | yellow |
| 84 | 3-methyl-1-phenyl-5-pyrazolone | yellow disp, |

-continued

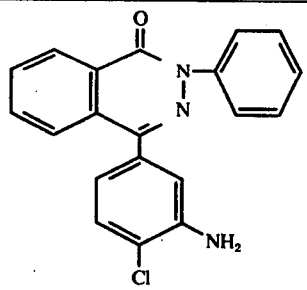

| Example | Coupling component | Hue |
|---|---|---|
| 85 | 3-methyl-5-hydroxy-1-(2,5-dichlorophenyl)pyrazole | yellow |
| 86 | 3-carbamoyl-5-hydroxy-1-phenylpyrazole | orange |
| 87 | 3-methyl-5-hydroxy-1-(4-sulfamoylphenyl)pyrazole | yellow |
| 88 | 3-methyl-5-hydroxy-1-(3-sulfamoylphenyl)pyrazole | yellow |
| 89 | 3-methyl-5-hydroxy-1-(4-methylphenyl)pyrazole | yellow, disp |
| 90 | 4-hydroxy-2-hydroxyquinoline | yellow |
| 91 | 2-chloro-N-(acetoacetyl)aniline | yellow |

-continued

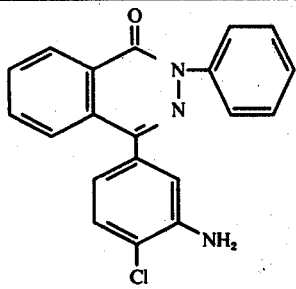

| Example | Coupling component | Hue |
|---|---|---|
| 92 | ⟨phenyl⟩—NHCOCH₂COCH₃ | yellow |
| 93 | 2-methoxyphenyl—NHCOCH₂COCH₃ | yellow |
| 94 | 2,5-dichlorophenyl—NHCOCH₂COCH₃ | yellow |
| 95 | 3-hydroxy-2-naphthoyl-NH-(4-chloro-2,5-dimethoxyphenyl) | red |
| 96 | phthalimido-C₆H₄—NHCOCH₂COCH₃ | yellow |
| 97 | barbituric acid (HN-CO-CH₂-CO-NH-CO ring) | yellow |
| 98 | 2,6-diamino-4-hydroxypyrimidine (HO, NH₂, N, N, NH₂) | yellow |
| 99 | 4-methyl-3-cyano-2,6-dihydroxypyridine | orange |
| 100 | CH₃CONH—C₆H₄—NHCOCH₂COCH₃ | yellow |

Diazo component for Examples 101 to 110:

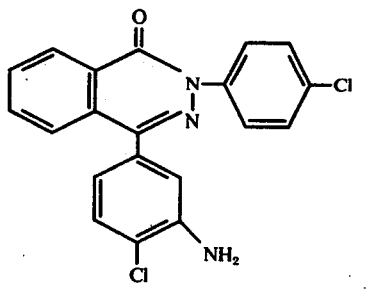
| Example | Coupling component | Hue |
|---|---|---|
| 101 | 3-hydroxy-N-phenyl-2-naphthamide | red |
| 102 | 3-hydroxy-N-(2,5-dimethoxyphenyl)-2-naphthamide | red |
| 103 | 3-hydroxy-N-(4-chlorophenyl)-2-naphthamide | red |
| 104 | 3-hydroxy-N-(5-chloro-2,4-dimethoxyphenyl)-2-naphthamide | Bordeaux |
| 105 | 3-hydroxy-N-(2-methyl-4-methoxyphenyl)-2-naphthamide | Bordeaux |
| 106 | 3-hydroxy-N-(4-methoxyphenyl)-2-naphthamide | red |
| 107 | 3-cyano-4-methyl-2,6-dihydroxypyridine | yellowish orange |

-continued
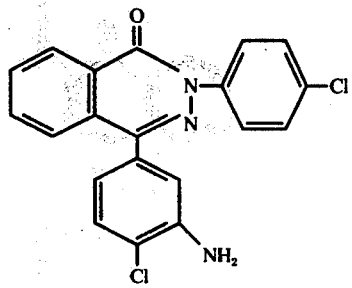
| Example | Coupling component | Hue |
|---------|-------------------|-----|
| 108 | 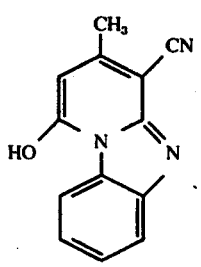 | brown |
| 109 | 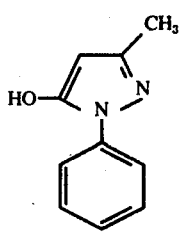 | yellow |
| 110 | 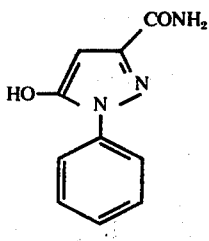 | orange |
| 111 | 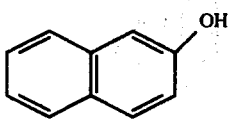 | orange |
Diazo component for Examples 112 to 118:

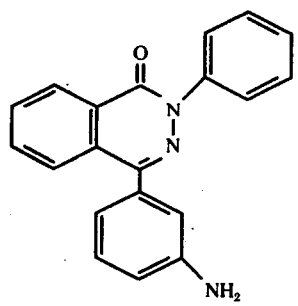
| Example | Coupling component | Hue |
|---|---|---|
| 112 | 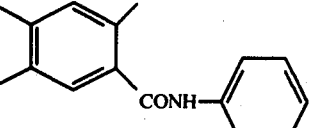 | red |
| 113 | 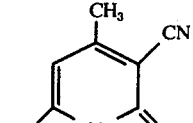 | red |
| 114 | 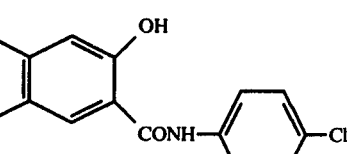 | yellow |
| 115 | 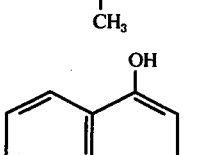 | red |
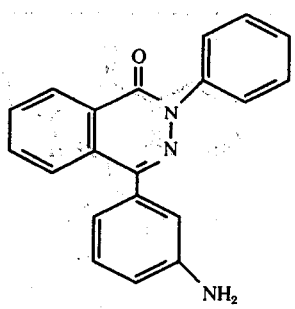
| Example | Coupling component | Hue |
|---|---|---|
| 116 | 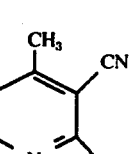 | yellow, disp |
| 117 | 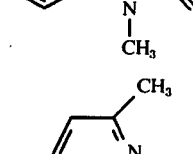 | yellow, disp |
| 118 | 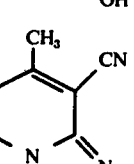 | yellow, disp |
Diazo component for Examples 119 to 112:
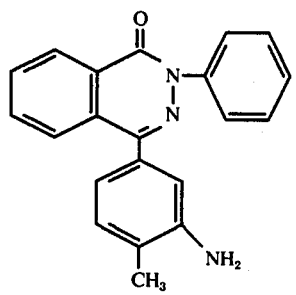
| Example | Coupling component | Hue |
|---|---|---|
| 119 |  | red |

-continued

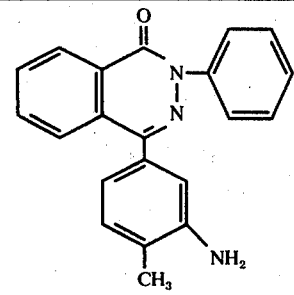

| Example | Coupling component | Hue |
|---|---|---|
| 120 | 3-hydroxy-N-(4-methoxyphenyl)-2-naphthamide (OH, CONH-C6H4-OCH3) | red |
| 121 | 4-methyl-3-cyano-2,6-dihydroxypyridine (CH3, CN, HO, OH) | yellow |
| 122 | 4-methyl-3-cyano-6-nitroso-1-(2-methylphenyl)pyridinone | reddish brown |

Diazo component for Examples 123 to 126:

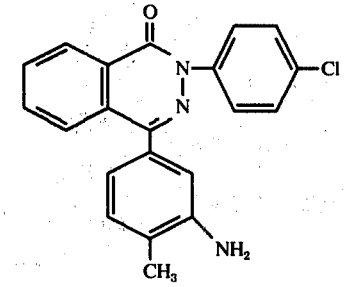

| Example | Coupling component | Hue |
|---|---|---|
| 123 | 3-hydroxy-N-phenyl-2-naphthamide (OH, CONH-C6H5) | red |
| 124 | 3-hydroxy-N-(2-methyl-5-chlorophenyl)-2-naphthamide | red |
| 125 | 4-methyl-3-cyano-2,6-dihydroxypyridine | orange |

-continued
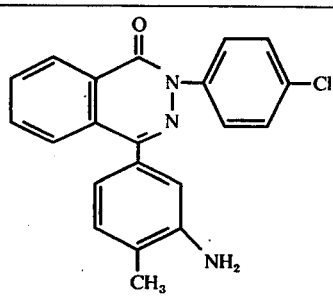
| Example | Coupling component | Hue |
|---|---|---|
| 126 | 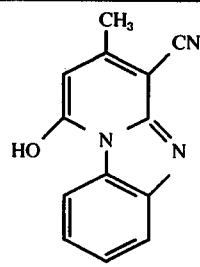 | reddish brown |
Diazo component for Examples 127-130:
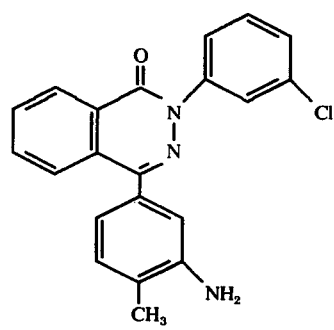
| Example | Coupling component | Hue |
|---|---|---|
| 127 | 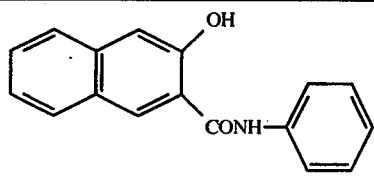 | red |
| 128 | 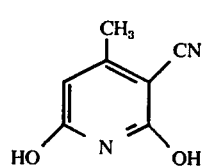 | orange |
| 129 | 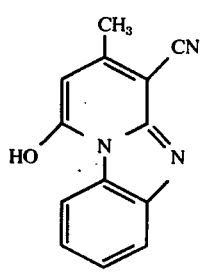 | brown |
-continued
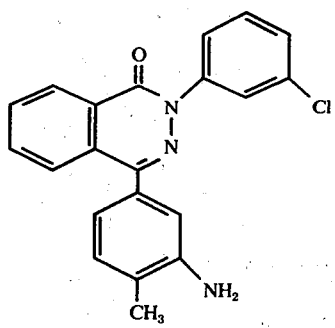
| Example | Coupling component | Hue |
|---|---|---|
| 130 | 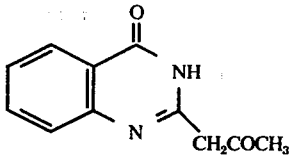 | yellow |
Diazo component for Examples 131 and 132:
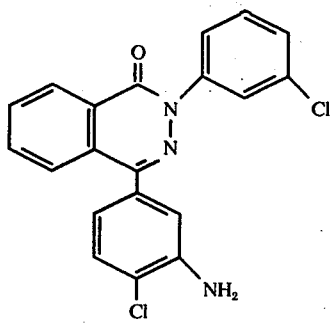
| Example | Coupling component | Hue |
|---|---|---|
| 131 | 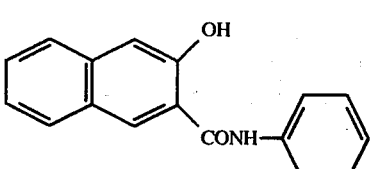 | red |
| 132 | 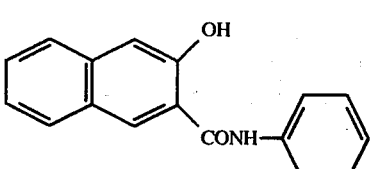 | orange |
Diazo component of Examples 133 and 134:

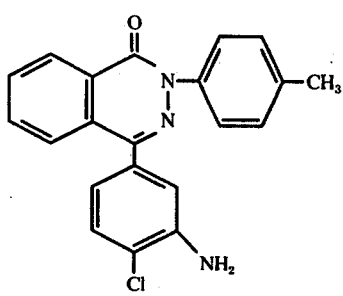

| Example | Coupling component | Hue |
|---|---|---|
| 133 | (2-hydroxy-3-naphthoic acid phenylamide) | red |
| 134 | (4-methyl-3-cyano-2,6-dihydroxypyridine) | orange |

Diazo component for Examples 135 to 137:

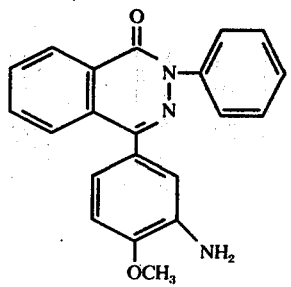

| Example | Coupling component | Hue |
|---|---|---|
| 135 | (2-hydroxy-3-naphthoic acid phenylamide) | red |
| 136 | (4-methyl-3-cyano-2,6-dihydroxypyridine) | brown |

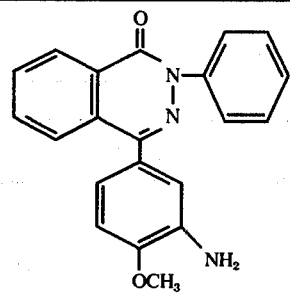

| Example | Coupling component | Hue |
|---|---|---|
| 137 | (4-methyl-3-cyano-6-hydroxy-pyridine fused to tolyl) | maroon |

EXAMPLE 138

28.2 parts of 1-(4'-amino-3'-nitrophenyl)-phthalazone-(4) is dissolved in 140 parts of concentrated sulfuric acid and diazotized at 0° to 10° C by adding 30 parts of nitrosylsulfuric acid (12.7% of $N_2O_3$). The whole is stirred for another four hours at 0° to 10° C and then the diazotization mixture is poured onto a mixture of 1000 parts of ice and 1000 parts of water, excess nitrite is removed by adding urea and then 26.3 parts of finely powdered 2-naphthol-3-carboxylic acid N-phenylamide is added. The pH is adjusted to 6 to 7 by dripping in dilute caustic soda solution. The whole is stirred for another six hours, suction filtered and washed thoroughly with water. The filtered product is introduced into 400 parts of glacial acetic acid and stirred for three hours at 100° C, suction filtered, washed thoroughly with glacial acetic acid and water and dried. There is obtained 40 parts of a red powder of the formula:

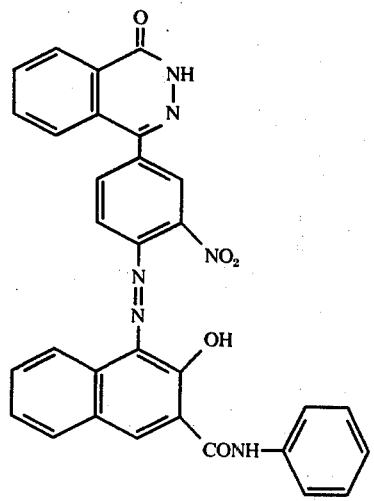

Similar dyes with the stated hues are obtained analogously to Example 138 with the coupling components given in the Table.
| Example | Coupling component | Hue |
|---|---|---|
| 139 | 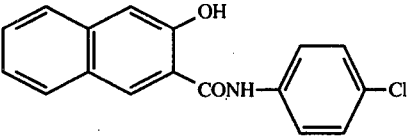 | red |
| 140 | 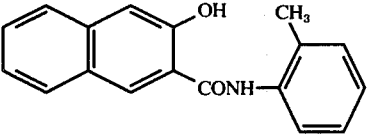 | red |
| 141 | 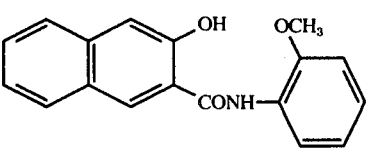 | red |
| 142 | 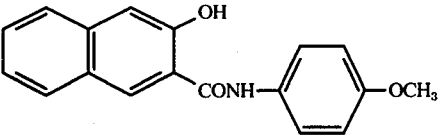 | Bordeaux |
| 143 | 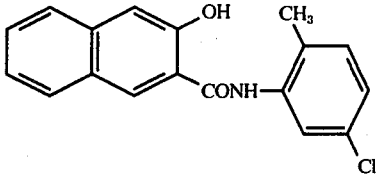 | red |
| 144 | 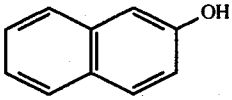 | orange |
| 145 |  | yellow |
| 146 | 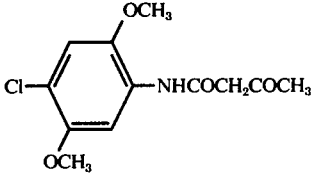 | yellow |
| 147 | 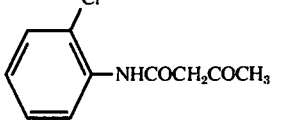 | yellow |
| 148 | 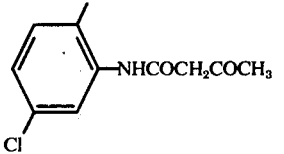 | yellow |

-continued
| Example | Coupling component | Hue |
|---------|-------------------|-----|
| 149 | 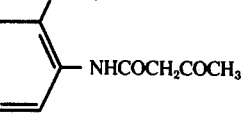 | yellow |
| 150 | 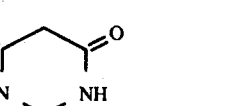 | yellow |
| 151 | 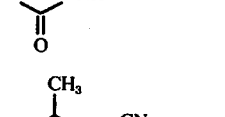 | orange |
| 152 | 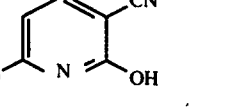 | orange |
Dyes with the stated hues are obtained analogously to Example 138 with the diazotization and coupling components of the following Table:
Diazo component for Examples 153 to 162:
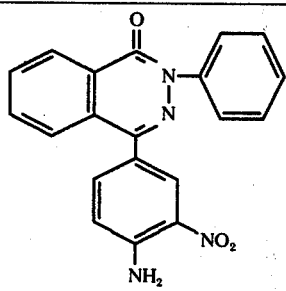
| Example | Coupling component | Hue |
|---------|-------------------|-----|
| 153 |  | red |
| 154 |  | red |
| 155 |  | Bordeaux |

-continued
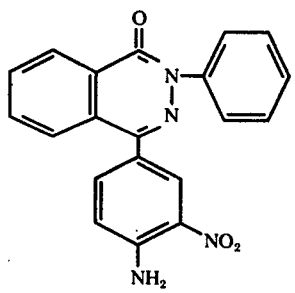
| Example | Coupling component | Hue |
|---------|-------------------|-----|
| 156 | 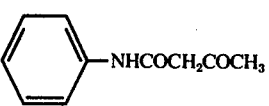 | yellow |
| 157 | 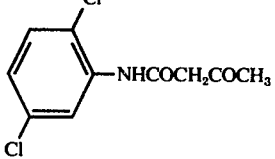 | yellow |
| 158 | 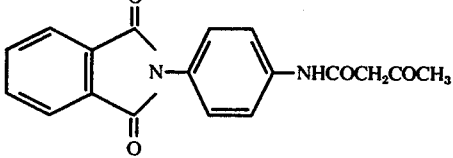 | yellow |
| 159 | 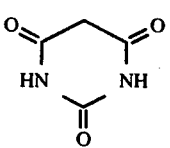 | yellow, disp |
| 160 | 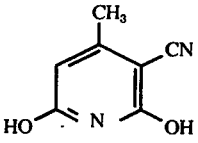 | orange |
| 161 | 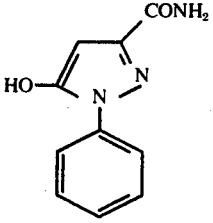 | orange |
| 162 | 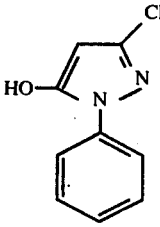 | yellow, disp |

EXAMPLE 163

38.2 parts of 1,3-diphenyl-5-amino-7,8-dichlorophthalazone-(4) is dissolved in 140 parts of concentrated sulfuric acid and diazotized by adding 30 parts of nitrosylsulfuric acid (12.7% of $N_2O_3$) at 0° to 10° C. The whole is stirred at 0° to 10° C for another four hours and then the diazotization mixture is poured onto a mixture of 1000 parts of ice and 1000 parts of water, excess nitrite is removed by adding urea and 26.3 parts of finely powdered 2-naphthol-3-carboxylic acid N-phenylamide is added. A pH of 6 to 7 is set up by dripping in dilute caustic soda solution. The whole is stirred for another six hours, suction filtered and washed thoroughly with water. The filtered product is introduced into 400 parts of dimethylformamide and stirred for three hours at 100° C, suction filtered, washed with dimethylformamide, methanol and water and dried. 42 parts of a red powder is obtained which has the formula:

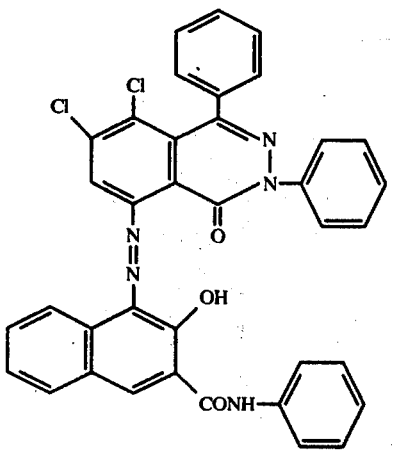

Similar dyes having the hues indicated are obtained analogously to Example 163 with the coupling components specified in the Table:

| Ex. | Coupling component | Hue |
|---|---|---|
| 164 | 2-hydroxy-naphthalene-3-carboxylic acid 4-chloroanilide | red |
| 165 | acetoacetanilide (C₆H₅-NHCOCH₂COCH₃) | yellow |
| 166 | 4-methyl-3-cyano-2,6-dihydroxypyridine | orange |

The following dyes characterized by their diazo and coupling components are also obtained analogously to Example 1.

| Ex. | Diazo component | Coupling component | Hue |
|---|---|---|---|
| 167 | 1-(2,4-dichloro-5-amino-phenyl)-4-oxo-phthalazine | 2-hydroxy-naphthalene-3-carboxylic acid anilide | red |
| 168 | " | 2-hydroxy-naphthalene-3-carboxylic acid 2-methoxyanilide | bluish red |
| 169 | " | 2-hydroxy-naphthalene-3-carboxylic acid 4-methoxyanilide | bluish red |

-continued

| Ex. | Diazo component | Coupling component | Hue |
|---|---|---|---|
| 170 | " | 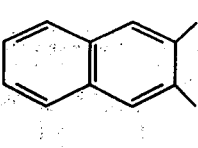 | red |
| 171 | " | 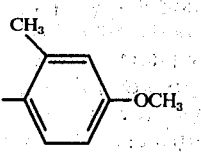 | yellow |
| 172 | " | 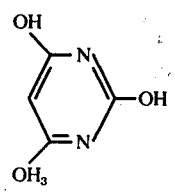 | yellow |

EXAMPLES OF USE

1. In surface coatings:

10 parts of the dye obtained according to Example 1 and 95 parts of a baking enamel formulation (for example 70% of coconut alkyd resin, 60% in xylene and 30% of melamine resin, about 55% in a mixture of butanol and xylene) are ground in an attrition mill. After having been applied and baked for thirty minutes at 120° C brilliant full color coatings are obtained having very good fastness to light and overspraying. Bright shades are achieved by the addition of titanium dioxide.

Similar surface coatings in the specified hues are obtained by using pigments described in the other Examples with the exception of those marked "disp".

2. In plastics:

Bright red colorations of polystyrene which have excellent fastness to light may be obtained by incorporating 0.5 part of the dye obtained according to Example 1 into 100 parts of polystyrene at 190° to 200° C in an extruder.

Colorations having good hiding power are obtained analogously by also incorporating 1 part of titanium dioxide.

Analogous results are obtained when the pigments from the other Examples (with the exception of those marked "disp") are used.

3. In printing inks:

8 parts of the pigment obtained according to Example 1, from 30 to 40 parts of resin (for example rosin modified with phenolformaldehyde) and from 55 to 65 parts of toluene are intimately mixed in a dispersion unit. A red toluene intaglio printing ink is thus obtained which has outstanding fastness to light and weathering and outstanding brilliance.

Similar results are obtained when the pigments from the other Examples (except those marked "disp") are used.

I claim:
1. A dye of the formula

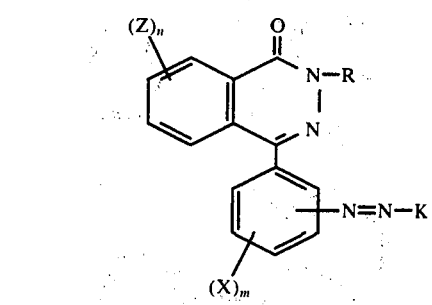

in which
R is hydrogen; phenyl; phenyl substituted by chloro, bromo, methyl, ethyl, methoxy, ethoxy, cyano, nitro, sulfamoyl, N-phenylsulfamoyl, phenylsulfonyl, carbamoyl, N-phenylcarbamoyl, acetylamino or benzoylamino; or naphthyl;
$m$ is 1 to 2;
$n$ is zero, 0, 1, 2, 3 or 4;
X is chloro;
Z is chloro or bromo; and K is $CH_3COCH-CONHAr^1$, 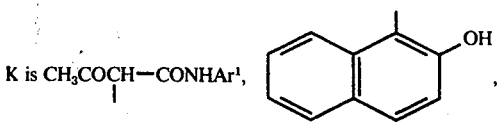

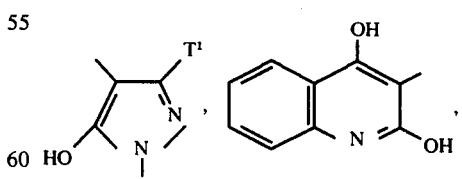

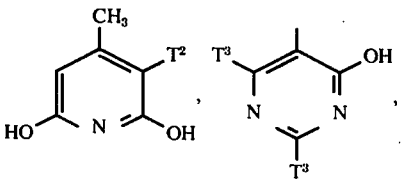

-continued

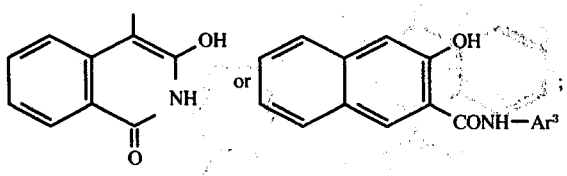

Ar¹ is phenyl or phenyl substituted by chlorine, methoxy, ethoxy, methyl, acetylamino, or benzoylamino;

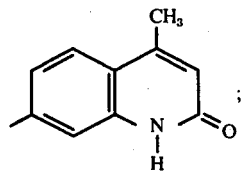

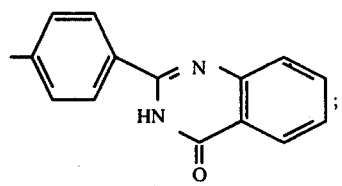

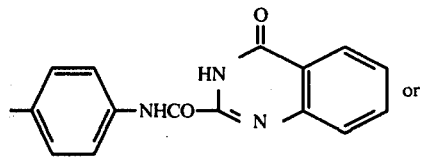

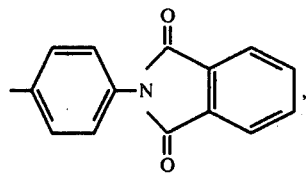

Ar² is phenyl or phenyl substituted by chlorine, methyl or sulfamoyl,
Ar³ is phenyl; phenyl substituted by chlorine, bromine, nitro, methoxy, ethoxy, alkyl of 1 to 4 carbon atoms, carbamoyl sulfamoyl, N-phenylcarbamoyl, N-chloro-, N-methyl- or N-methoxyphenylcarbamoyl, N-β-anthraquinonyl-carbamoyl, phthalimido, benzoylamino, benzoylamino substituted by chlorine, methyl, methoxy or acetylamino;

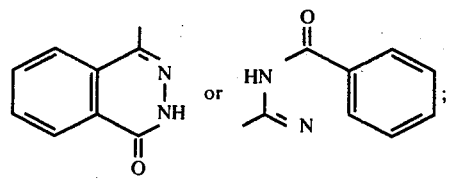

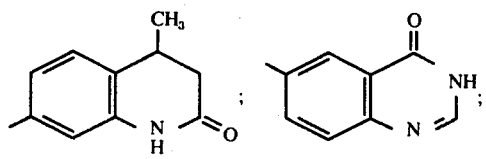

-continued

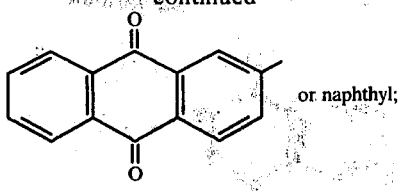 or naphthyl;

T¹ is methyl or carbamoyl;
T² is cyano or carbamoyl; and
T³ is hydroxyl or amino.

2. A dye according to claim 1, wherein K is CH₃COCHCONHAr¹,

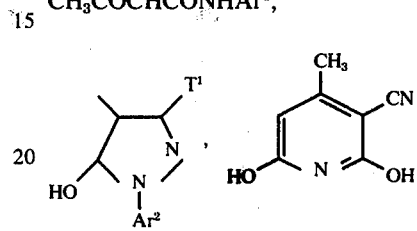

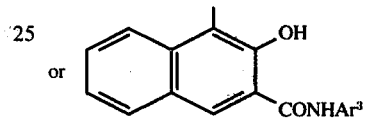

and Ar¹, Ar², Ar³ and T¹ have the meanings given in claim 1.

3. A dye according to claim 1, wherein K is

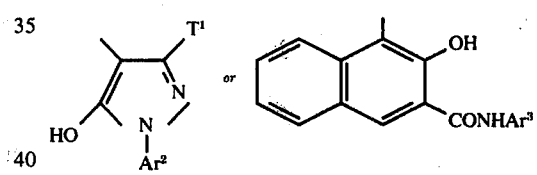

and Ar², Ar³ and T¹ have the meanings given in claim 1.

4. A dye according to claim 3 wherein T¹ is methyl; Ar² is phenyl or phenyl substituted by chloro; and Ar³ is phenyl; phenyl substituted by chloro, methyl, methoxy, ethoxy, acetylamino, benzoylamino or phthalimido; or naphthyl.

5. A dye according to claim 1 wherein n is zero.

6. A dye according to claim 1 wherein R is hydrogen.

7. A dye according to claim 1 of the formula

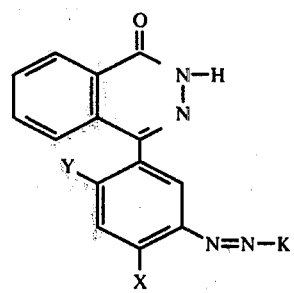

wherein
X is chloro,
Y is hydrogen or chloro and
K is as defined in claim 3.

8. The dye according to claim 1 of the formula
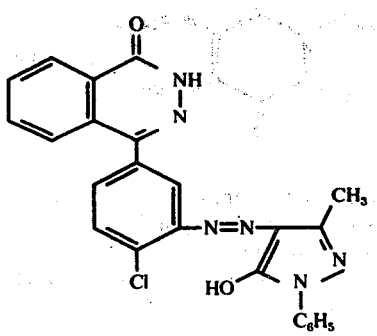
9. The dye according to claim 1 of the formula
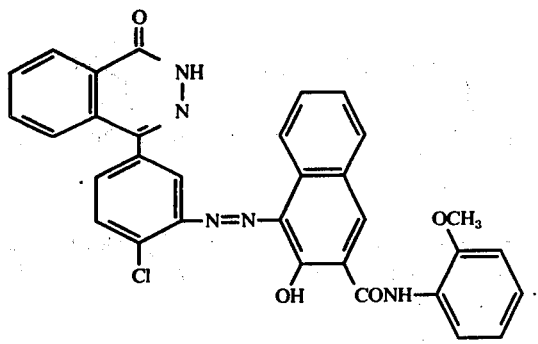
* * * * *